(12) United States Patent
Inbar et al.

(10) Patent No.: US 8,229,262 B2
(45) Date of Patent: Jul. 24, 2012

(54) METHOD AND SYSTEM FOR PACKAGING A HIGH POWER FIBER-OPTIC COUPLER

(75) Inventors: Eran Inbar, Ramat-Gan (IL); Yoav Sintov, Petach Tikva (IL)

(73) Assignees: V-Gen Ltd., Ramat-Gan (IL); State of Israel-SOREQ Nuclear Research Center, Yavne (IL)

( * ) Notice: Subject to any disclaimer, the term of this patent is extended or adjusted under 35 U.S.C. 154(b) by 0 days.

(21) Appl. No.: 12/725,889

(22) Filed: Mar. 17, 2010

(65) Prior Publication Data

US 2010/0239209 A1  Sep. 23, 2010

Related U.S. Application Data

(60) Provisional application No. 61/161,619, filed on Mar. 19, 2009.

(51) Int. Cl.
*G02B 6/26* (2006.01)
*G02B 6/42* (2006.01)

(52) U.S. Cl. ............ 385/51; 385/31; 385/39; 385/42; 385/45; 385/50

(58) Field of Classification Search .............. 385/31, 385/39, 42, 45, 50, 51
See application file for complete search history.

(56) References Cited

U.S. PATENT DOCUMENTS

| | | | |
|---|---|---|---|
| 4,884,860 A * | 12/1989 | Brown | 385/27 |
| 4,976,512 A * | 12/1990 | Safaai-Jazi | 385/30 |
| 2005/0163424 A1 * | 7/2005 | Chen | 385/37 |
| 2007/0189690 A1 * | 8/2007 | Hayashi et al. | 385/129 |

* cited by examiner

*Primary Examiner* — Ryan Lepisto
*Assistant Examiner* — Jerry Blevins
(74) *Attorney, Agent, or Firm* — Choate Hall & Stewart LLP; Fangli Chen

(57) ABSTRACT

A fiber-optic coupler packaging including an internal encapsulation for encapsulating a fiber-optic coupler, the refraction index of the internal encapsulation is smaller than the refraction index of the fiber-optic coupler, and an external encapsulation, for encapsulating the internal encapsulation, the refraction index of the external encapsulation is greater than the refraction index of the internal encapsulation, the internal encapsulation and the external encapsulation are substantially transparent to the range of wavelengths of the light traveling inside the fiber-optic coupler.

11 Claims, 2 Drawing Sheets

METHOD AND SYSTEM FOR PACKAGING A HIGH POWER FIBER-OPTIC COUPLER

CROSS-REFERENCE TO RELATED APPLICATION

This application claims priority to U.S. Provisional Patent Application Ser. No. 61/161,619, filed Mar. 19, 2009, the entire contents of which are hereby incorporated by reference.

FIELD OF THE DISCLOSED TECHNIQUE

The disclosed technique relates to fiber-optic couplers, in general, and to methods and systems for packaging a high power fiber-optic coupler, in particular.

BACKGROUND OF THE DISCLOSED TECHNIQUE

Fiber-optic couplers are known in the art, and are employed for optically coupling fiber-optic components. Fiber-optic couplers are constructed in various methods, such as fused bi-conical couplers, dichroic couplers (i.e., Wavelength Division Multiplexing—WDM), fused-end couplers, side couplers and the like. Fiber-optic couplers have various configurations, such as a Y-shaped coupler (i.e., fusing two fiber-optic cables into a single cable—2X1), an X-shaped coupler (2X2), and the like.

Light losses in the coupler area are minimized, and an efficient coupling is achieved, by surrounding the coupler with materials having refractive index smaller than that of the coupler (i.e., lower than that of each of the fibers of the coupler). Low refractive index encapsulation of the fiber-optic coupler further protects the fiber-optic coupler from impurities (e.g., dust particles) and humidity. Generally, the low refractive index encapsulation is optically transparent for light of the range of wavelengths of the coupled fibers.

High power fiber-optics include fiber-optic components (e.g., fibers and couplers) which transmit optical power exceeding the order of 1 Watt. High power fiber-optic couplers are exposed to thermal effects which degrade coupling efficiency and might even damage the components of the coupler. A known approach to the problem of thermal effects is encasing the coupler in a thermally conductive packaging, and coupling the package with a heat-sink. The heat-sink evacuates excess heat from the coupler packaging to the surrounding environment.

There are several mechanisms which generate heat at the coupler area. A first mechanism of heat generation is the absorption of light in impurities within the coupler, and the transformation of the absorbed light into heat. This mechanism is minimized by employing optically transparent coupler encapsulation and adhesives. A second mechanism is the absorption of light escaping from the coupler in the metal coupler packaging. The efficiency of most couplers ranges between 85%-95% (i.e., the light loss ranges between 5%-15%, which might be transformed into heat by absorption in the metal packaging).

U.S. Pat. No. 5,822,482 issued to Atkeinsson et al., and entitled "Fiber Optic Coupler Package with Strain Relief and Packaging Method", is directed to a protective packaging for a fiber optic coupler. A fiber optic coupler protective body is a rectangular block of quartz, which includes a longitudinal channel. The fiber optic coupler is coupled with the protective body by an adhesive, such that the fiber optic coupler is suspended within the longitudinal channel of the protective body.

U.S. Pat. No. 6,167,176 issued to Belt and entitled "Fiber Optic Coupler", is directed to a fiber optic coupler. The fiber optic coupler is bonded to a substrate of a clamshell shaped Neoceram sleeve. The Neoceram sleeve forms a primary chamber, and is closed at both ends with thixotropic paste. A secondary Invar (FeNi36) tube is positioned over the primary chamber, and both its ends are filled with epoxy. The Invar tube is further encapsulated within thixotropic paste. A tertiary tube is positioned over the secondary tube and both its ends are filled with epoxy. It is noted that, Invar is an opaque nickel steel alloy which absorbs light and transforms it into heat.

U.S. Pat. No. 6,788,852 issued to Xu and entitled "Double Tube Fiber Coupler Package", is directed to a fiber optic coupler package. The package includes an inner cylindrical sleeve made from quartz and an outer cylinder made of Invar. The thermal expansion coefficient of the Invar cylinder is substantially zero. The package provides moisture, anti-vibration, impact, corrosion, and thermal expansion protection.

SUMMARY OF THE PRESENT DISCLOSED TECHNIQUE

It is an object of the disclosed technique to provide a novel method and system for packaging a high-power fiber-optic coupler, which overcomes the disadvantages of the prior art.

In accordance with the disclosed technique, there is thus provided a fiber optic coupler packaging. The fiber-optic coupler packaging includes an internal encapsulation and an external encapsulation. The internal encapsulation is encapsulating a fiber optic coupler. The refraction index of the internal encapsulation is smaller than the refraction index of the fiber optic coupler. The external encapsulation is encapsulating the internal encapsulation. The refraction index of the external encapsulation is greater than the refraction index of the internal encapsulation. The internal encapsulation and the external encapsulation are substantially transparent to the range of wavelengths of the light traveling inside the fiber optic coupler.

In accordance with another embodiment of the disclosed technique, there is thus provided a fiber optic coupler packaging method including the steps of encapsulating a fiber optic coupler within an internal encapsulation, and encapsulating the internal encapsulation within an external encapsulation. The refraction index of the internal encapsulation is smaller than that of the fiber optic coupler. The refraction index of the external encapsulation is greater than the refraction index of the internal encapsulation. Both the internal encapsulation and the external encapsulation are substantially transparent to the range of wavelengths of the light traveling inside the fiber optic coupler.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by packaging a fiber-optic coupler with an internal encapsulation having a refractive index smaller than that of the coupled optical fibers. Further, an external encapsulation, surrounding the internal encapsulation, has a refractive index greater than that of the internal encapsulation. In the following description, the terms "fiber-optic cable", "optical fiber" and "fiber" are used interchangeably. The term "coupler configuration", as detailed herein below, refers to the number of incoming and outgoing fibers of a fiber-optic coupler. For example, a coupler having a 3X2 configuration includes three incoming fibers and two outgoing fibers.

Figure 1A:
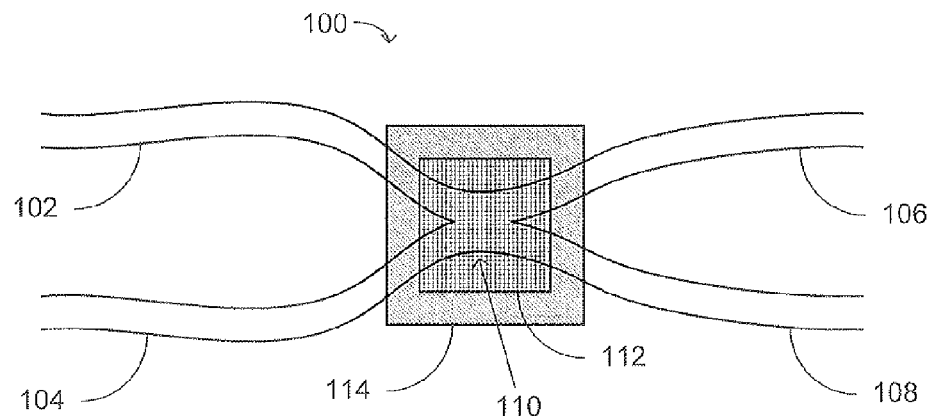
FIG. 1A is a schematic illustration of a fiber-optic coupler packaging system, constructed and operative in accordance with an embodiment of the disclosed technique.

Reference is now made to FIG. 1A, which is a schematic illustration of a fiber-optic coupler packaging system, generally referenced 100, constructed and operative in accordance with an embodiment of the disclosed technique. Packaging system 100 includes a first incoming optical fiber 102 a second incoming optical fiber 104, a first outgoing optical fiber 106, a second outgoing optical fiber 108, a fiber-optic coupler 110, an internal encapsulation 112, and an external encapsulation 114. Fiber-optic coupler 110 couples incoming optical fibers 102 and 104 with outgoing optical fibers 106 and 108. Internal encapsulation 112 encapsulates fiber-optic coupler 110. External encapsulation 114 encapsulates internal encapsulation 112.

Optical fibers 102, 104, 106, and 108 are employed for various applications such as fiber-optic communication cables, fiber-optic sensors, fiber lasers, and the like. Optical fibers 102, 104, 106, and 108 can be constructed of any optical fiber known in the art, such as multi-mode fiber, single mode fiber, Large Mode Aperture (LMA), double-clad fiber, rear-earth doped double clad fiber, and the like. Fiber-optic coupler 110 can be constructed according to any method known in the art (e.g., fused bi-conical couplers, Wavelength Division Multiplexing (WDM) couplers, fused-end couplers, and side couplers), and can be of any configuration (e.g., 2X1, 2X2, 3X2, 2X4). In the example set forth in FIGS. 1A and 1B, coupler 110 is of a 2X2 coupler configuration. 2X1 (Y coupler);

Internal encapsulation 112 is constructed of an encapsulating material surrounding fiber-optic coupler 110. The encapsulating material of internal encapsulation 112 can be, for example, an adhesive, a curable material, a liquid, a gas, and the like. The refractive index of the material of internal encapsulation 112 is smaller than that of any of fibers 102, 104, 106 and 108. Internal encapsulation 112 is substantially optically transparent to the range of wavelengths of the light traveling inside fibers 102, 104, 106 and 108.

The material of internal encapsulation 112 further facilitates other coupler properties such as mechanical robustness, moisture and impurities protection, and the like. For example, by employing internal encapsulation 112 of a mechanically robust material (e.g., PC-363 cladding by Luvantix or SSCP), the mechanical robustness of coupler 110 is enhanced. Protection from moisture and from impurities is achieved by encapsulating coupler 110 with internal encapsulation 112 which is impervious to moisture and to impurities, respectively (e.g., PC-363 cladding by Luvantix or SSCP). Internal encapsulation 112 is formed by any encapsulation method known in the art, such as direct injection of a curable material, fiber-optic re-coater, filling of a glass ferrule (as detailed herein below with reference to FIG. 1B), and the like.

External encapsulation 114 is constructed of an encapsulating material surrounding internal encapsulation 112. The encapsulating material of external encapsulation 114 can be, for example, an adhesive, a curable material, a liquid, a gas, and the like. The refractive index of the material of external encapsulation 114 is greater than that of the refractive index of internal encapsulation 112. External encapsulation 114 is substantially optically transparent to the range of wavelengths of the light traveling inside fibers 102, 104, 106 and 108.

The material of external encapsulation 114 can also facilitate other coupler properties such as mechanical robustness, moisture and impurities protection, and the like. For example, by employing external encapsulation 114 of a mechanically robust material (e.g., NOA-61 by Norland), the mechanical robustness of coupler 110 is enhanced. Protection from moisture and from impurities is achieved by encapsulating coupler 110 with external encapsulation 114 which is impervious to moisture and to impurities, respectively (e.g., NOA-61 by Norland). External encapsulation 114 is formed by any encapsulation method known in the art. The structure of packaging 100 is directed at evacuating light escaping from the coupler, such that the light is not transformed into heat at the vicinity of the coupler as detailed herein below with reference to FIG. 2. In this manner thermal effects within the coupler are decreased.

Figure 1B:
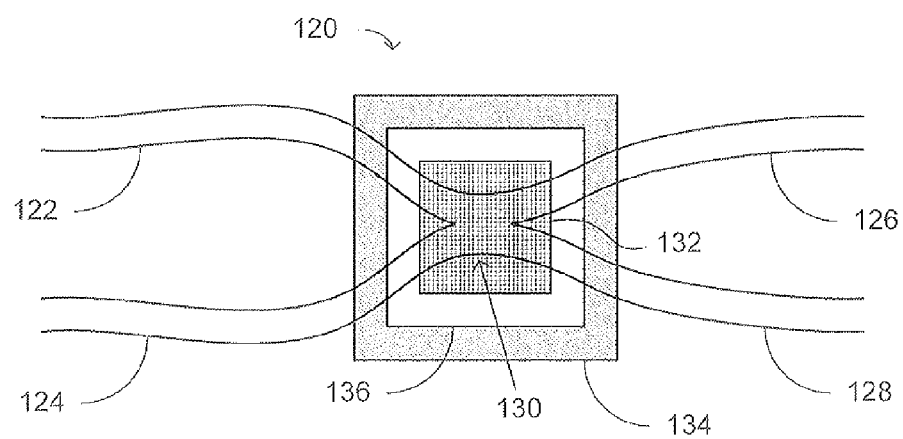
FIG. 1B is a schematic illustration of a fiber-optic coupler packaging system, constructed and operative in accordance with another embodiment of the disclosed technique.

Reference is now made to FIG. 1B, which is a schematic illustration of a fiber-optic coupler packaging system, generally referenced 120, constructed and operative in accordance with another embodiment of the disclosed technique. Fiber-optic coupler packaging system 120 includes a first incoming optical fiber 122 a second incoming optical fiber 124, a first outgoing optical fiber 126, a second outgoing optical fiber 128, a fiber-optic coupler 130, an internal encapsulation 132, an external encapsulation 134, and a glass ferrule 136. Fiber-optic coupler 130 couples incoming optical fibers 122 and 124 with outgoing optical fibers 126 and 128. Internal encapsulation 132 encapsulates fiber-optic coupler 130. Glass ferrule 136 encapsulates internal encapsulation 132 and is encapsulated within external encapsulation 134.

Glass ferrule 136 is employed for the formation of internal encapsulation 132. Glass ferrule 136 is tubular shaped, and includes a longitudinal channel (not shown). Coupler 130 is positioned within the longitudinal channel. The material of internal encapsulation 132 fills the longitudinal channel and encapsulates coupler 130. External encapsulation 134 encapsulates glass ferrule 136, which already includes internal encapsulation 132 (i.e., positioned within the longitudinal channel of glass ferrule 136). The refractive index of external encapsulation 134 is greater than that of internal encapsulation 132, and than that of glass ferrule 136.

Figure 2:
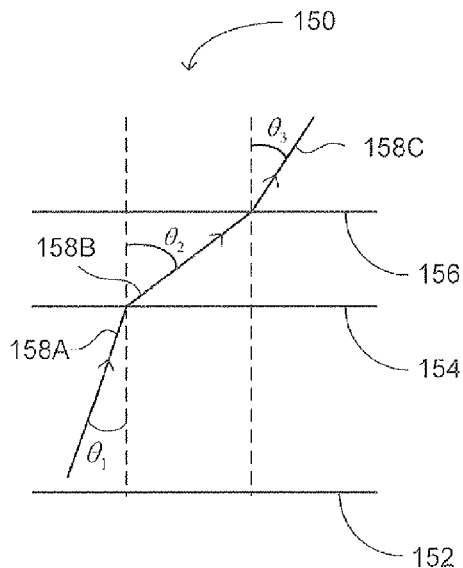
FIG. 2 is a schematic illustration of an enlarged view of fiber-optic coupler packaging system, constructed and operative in accordance with a further embodiment of the disclosed technique.

Reference is now made to FIG. 2, which is a schematic illustration of an enlarged view of fiber-optic coupler packaging system, generally referenced 150, constructed and operative in accordance with a further embodiment of the disclosed technique. Packaging system 150 includes a coupler 152 an internal encapsulation 154, and an external encapsulation 156. Internal encapsulation 154 encapsulates coupler 152. External encapsulation 156 encapsulates internal encapsulation 154. Coupler 152 is substantially similar to coupler 110 of FIG. 1A. Internal encapsulation 154 is substantially similar to internal encapsulation 112 of FIG. 1A. External encapsulation 156 is substantially similar to external encapsulation 114 of FIG. 1A.

A ray of light 158A escapes coupler 152 (i.e., the efficiency of coupler 152 is less than 100%, such that a portion of the light escapes coupler 152 and does not enter any of the outgoing fibers). Light ray 158A reaches internal encapsulation 154 at an angle $\theta_1$ relative to the normal to the contact surface between coupler 152 and internal encapsulation 154. The refractive index of internal encapsulation 154 is smaller than that of coupler 152 (i.e., smaller than that of any of the fibers of coupler 152). Light ray 158A is refracted at the passage from coupler 152 into internal encapsulation 154, as a light ray 158B. Light ray 158B enters internal encapsulation 154 at an angle $\theta_2$ relative to the normal to the contact surface between coupler 152 and internal encapsulation 154, such that $\theta_2$ is greater than $\theta_1$. The refractive index of external encapsulation 156 is greater than that of internal encapsulation 154. Light ray 158B is refracted at the passage from internal encapsulation 154 into external encapsulation 156, as a light ray 158C. Light ray 158C enters external encapsulation 156 at an angle $\theta_3$ relative to the normal to the contact surface between internal encapsulation 154 and external encapsulation 156, such that $\theta_3$ is smaller than $\theta_2$.

Light ray 158A escaping from coupler 152 is either totally reflected back into coupler 152 (not shown) or is refracted upon entrance into internal encapsulation 154 (FIG. 2). Light ray 158B passes from internal encapsulation 154 into external encapsulation 156 (i.e., where the light ray is denoted as 158C) and cannot be totally reflected as the refractive index of external encapsulation 156 is greater than that of internal encapsulation 154. In this manner, light escaping from coupler 152 is evacuated from packaging system 150 and the thermal effect in the area of coupler 152 is decreased.

Figure 3:
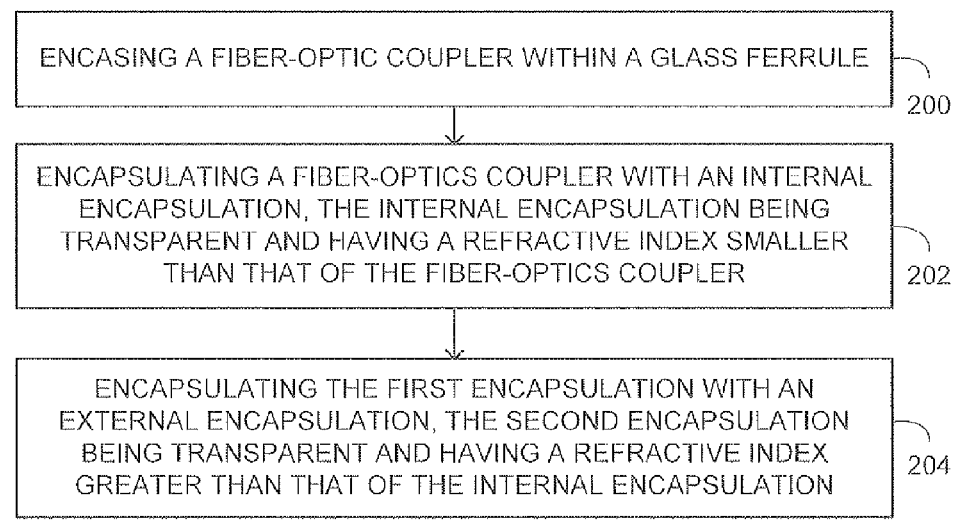
FIG. 3 is a schematic illustration of a method for packaging a fiber-optic coupler, operative in accordance with another embodiment of the disclosed technique.

Reference is now made to FIG. 3, which is a schematic illustration of a method for packaging a fiber-optic coupler, operative in accordance with another embodiment of the disclosed technique. In procedure 200, a fiber-optic coupler is encased within a glass ferrule. The glass ferrule forms an internal encapsulation around the coupler. With reference to FIG. 1B, coupler 110 is positioned within the longitudinal channel (not shown) of glass ferrule 116. It is noted that encasing the coupler within the glass ferrule is an optional procedure for forming an internal encapsulation and is not essential.

In procedure 202, the coupler is encapsulated within an internal encapsulation. The internal encapsulation has a refractive index smaller than that of the fiber optics coupler and is transparent (i.e., substantially transparent to the wavelength range of the coupler). With reference to FIG. 1B, internal encapsulation 112 encapsulates coupler 110. In procedure 204, the internal encapsulation is encapsulated within an external encapsulation. In case the internal encapsulation was formed by employing a glass ferrule, the glass ferrule is also encapsulated within the external encapsulation. The external encapsulation has a refractive index greater than that of the internal encapsulation and is transparent (i.e., substantially transparent to the wavelength range of the fibers of the coupler).

It will be appreciated by persons skilled in the art that the disclosed technique is not limited to what has been particularly shown and described hereinabove. Rather the scope of the disclosed technique is defined only by the claims, which follow.

The invention claimed is:

1. An apparatus comprising:
    an internal encapsulation adapted to encapsulate a fiber-optic coupler, at least a portion of a first optical fiber, and at least a portion of a second optical fiber,
        wherein the fiber-optic coupler is adapted to couple the first optical fiber to the second optical fiber, and
        wherein an index of refraction of the internal encapsulation is smaller than an index of refraction of the fiber-optic coupler; and
    an external encapsulation adapted to encapsulate the internal encapsulation, wherein an index of refraction of the external encapsulation is larger than the index of refraction of the internal encapsulation such that a substantial portion of light within said fiber-optic coupler escapes said fiber-optic coupler and does not enter either of the first optical fiber or the second optical fiber;
    wherein the internal encapsulation and the external encapsulation are substantially transparent to the range of wavelengths of the light traveling inside the fiber-optic coupler.

2. The apparatus of claim 1, wherein each of said internal encapsulation and said external encapsulation is constructed of a material selected from the list consisting of:
    an adhesive material;
    a curable material;
    a liquidus material; and
    a gaseous material.

3. The apparatus of claim 1, wherein each of said internal encapsulation and said external encapsulation further facilitates at least one coupler property selected from the list consisting of:
    mechanical robustness;
    moisture protection; and
    protection from impurities.

4. The apparatus of claim 1, further comprising a glass ferrule encapsulating said internal encapsulation, wherein said external encapsulation encapsulating said glass ferrule, and wherein the refraction index of said external encapsulation is greater than the refraction index of said glass ferrule.

5. The fiber-optic coupler apparatus of claim 1, wherein said fiber-optic coupler being constructed according to a method selected from the list consisting of:
    fused bi-conical coupler;
    wavelength division multiplexing coupler;
    fused-end coupler; and
    side coupler.

6. The fiber-optic coupler packaging of claim 1, wherein each of a plurality of optical fibers of said fiber-optic coupler is selected from the list consisting of:
    multi-mode fiber;
    single mode fiber;
    large mode aperture;
    double-clad fiber; and
    rear-earth doped double-clad fiber.

7. The fiber-optic coupler apparatus of claim 1, wherein said fiber-optic coupler being of a configuration selected from the list consisting of:
    2X1 (Y coupler); and
    2X2 (X coupler).

8. Method for packaging a fiber-optic coupler, the method comprising the following procedures:
    encapsulating said fiber-optic coupler at least a portion of a first optical fiber, and at least a portion of a second optical fiber within an internal encapsulation wherein the fiber-optic coupler is adapted to couple the first optical fiber to the second optical fiber, the refraction index of said internal encapsulation being smaller than that of said fiber-optic coupler; and encapsulating said internal encapsulation within an external encapsulation, the refraction index of said external encapsulation being greater than the refraction index of said internal encapsulation such that a substantial portion of light within said fiber-optic coupler escapes said fiber-optic coupler and does not enter either of the first optical fiber or the second optical fiber;

wherein both said internal encapsulation and said external encapsulation being substantially transparent to the range of wavelengths of the light traveling inside said fiber-optic coupler.

9. The packaging method of claim 8, wherein said procedure of encapsulating within said internal encapsulation is performed by a technique selected from the list consisting of:
   direct injection of a curable material; and
   employing a fiber-optic re-coater.

10. The packaging method of claim 8, further comprising the pre-procedure of positioning said fiber-optic coupler within a glass ferrule, said procedure of encapsulating within said internal encapsulation is performed by filling said glass ferrule with said internal encapsulation, said procedure of encapsulating within said external encapsulation is performed by encapsulating said glass ferrule within said external encapsulation, and wherein the refraction index of said external encapsulation being greater than the refraction index of said glass ferrule.

11. The packaging method of claim 8, wherein each of said internal encapsulation and said external encapsulation further facilitates at least one coupler property selected from the list consisting of:
   mechanical robustness;
   moisture protection; and
   protection from impurities.

\* \* \* \* \*